US011005965B2

(12) United States Patent
Latapie et al.

(10) Patent No.: US 11,005,965 B2
(45) **Date of Patent: *May 11, 2021**

(54) CONTEXTUAL SERVICES IN A NETWORK USING A DEEP LEARNING AGENT

(71) Applicant: Cisco Technology, Inc., San Jose, CA (US)

(72) Inventors: Hugo Latapie, Long Beach, CA (US); Enzo Fenoglio, Issy-les-Moulineaux (FR); Plamen Nedeltchev, San Jose, CA (US); Manikandan Kesavan, Campbell, CA (US); Joseph Friel, Ardmore, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,518

(22) Filed: Oct. 29, 2019

(65) Prior Publication Data

US 2020/0068041 A1 Feb. 27, 2020

Related U.S. Application Data

(63) Continuation of application No. 15/185,157, filed on Jun. 17, 2016, now Pat. No. 10,498,855.

(51) Int. Cl.
*G06F 15/16* (2006.01)
*H04L 29/08* (2006.01)
(Continued)

(52) U.S. Cl.
CPC .......... *H04L 67/306* (2013.01); *H04L 41/145* (2013.01); *H04L 41/16* (2013.01);
(Continued)

(58) Field of Classification Search
CPC ... H04L 43/08; H04L 67/306; H04L 41/0233; H04L 67/02; H04L 67/2804;
(Continued)

(56) References Cited

U.S. PATENT DOCUMENTS 8,965,922 B2 2/2015 Kandogan et al.
9,135,359 B2 9/2015 Dicker et al.
(Continued)

OTHER PUBLICATIONS

"Deep learning" https://en.wikipedia.org/wiki/Deep_learning, May 2016, pp. 1-30, Wikimedia Foundation, Inc.
(Continued)

*Primary Examiner* — Oleg Survillo
(74) *Attorney, Agent, or Firm* — Behmke Innovation Group LLC; James M. Behmke; Jonathon P. Western

(57) ABSTRACT

In one embodiment, a device in a network monitors a plurality of traffic flows in the network. The device extracts a plurality of features from the monitored plurality of traffic flows. The device generates a context model by using deep learning and reinforcement learning on the plurality of features extracted from the monitored traffic flows. The device applies the context model to a particular traffic flow associated with a client, to determine a context for the particular traffic flow. The device personalizes data sent to the client from a remote source based on the determined context.

18 Claims, 11 Drawing Sheets

(51) Int. Cl.
*H04L 12/26* (2006.01)
*H04L 12/24* (2006.01)

(52) U.S. Cl.
CPC .............. *H04L 43/04* (2013.01); *H04L 67/02* (2013.01); *H04L 67/2804* (2013.01); *H04L 67/327* (2013.01); *H04L 41/046* (2013.01); *H04L 43/026* (2013.01)

(58) Field of Classification Search
CPC ..... H04L 67/327; H04L 43/04; H04L 43/026; H04L 41/16; H04L 41/145; H04L 41/046
See application file for complete search history.

(56) References Cited

U.S. PATENT DOCUMENTS

| | | | |
|---|---|---|---|
| 2010/0299589 | A1 | 11/2010 | Yamada |
| 2013/0241952 | A1 | 9/2013 | Richman et al. |
| 2013/0263023 | A1 | 10/2013 | Goodwin et al. |
| 2013/0272181 | A1 | 10/2013 | Fong et al. |
| 2014/0047002 | A1 | 2/2014 | Plant |
| 2015/0235143 | A1 | 8/2015 | Eder |
| 2016/0034809 | A1 | 2/2016 | Trenholm et al. |
| 2016/0048580 | A1 | 2/2016 | Raman |
| 2016/0285704 | A1* | 9/2016 | Gasparakis ........... H04L 41/142 |
| 2017/0053295 | A1 | 2/2017 | Tiell et al. |
| 2017/0169357 | A1* | 6/2017 | Caspi .................... H04L 43/045 |
| 2017/0279829 | A1* | 9/2017 | Vasseur ............... H04L 63/0236 |
| 2017/0279848 | A1* | 9/2017 | Vasseur ............... H04L 63/1458 |
| 2017/0344910 | A1 | 11/2017 | Wu |

OTHER PUBLICATIONS

Foerster et al. "Learning to Communicate to Solve Riddles with Deep Distributed Recurrent Q-Networks" Feb. 8, 2016; pp. 1-10, arXiv:1602.02672v1 [cs.AI].

Thomas, et al. "Holonic and Multi-Agent technologies for service and computing oriented manufacturing", Journal of Intelligent Manufacturing, vol. 28, Issue 7, Oct. 2017, 3 pages.

* cited by examiner

CONTEXTUAL SERVICES IN A NETWORK USING A DEEP LEARNING AGENT

RELATED APPLICATION

This application is a continuation of U.S. patent application Ser. No. 15/185,157, filed on Jun. 17, 2016, entitled CONTEXTUAL SERVICES IN A NETWORK USING A DEEP LEARNING AGENT, by Hugo Latapie, et al., the contents of which are incorporated by reference herein.

TECHNICAL FIELD

The present disclosure relates generally to computer networks, and, more particularly, to providing contextual services in a network using a deep learning agent.

BACKGROUND

Enterprise networks are carrying a fast growing volume of both business and non-business critical traffic. Notably, enterprise networks typically support a large number of applications, leading to a very diverse set of application traffic. For example, the network traffic may include videoconferencing traffic, Internet browsing traffic, email traffic, non-user traffic (e.g., reporting traffic from deployed sensors, etc.), and the like.

Typically, users interact with deployed services, knowledge repositories, etc., on an individual basis. For example, an enterprise user may access a project management system to define a project management timeline for a project, access a document management system to review documents relating to the project, perform web searches to retrieve information in support of the project, etc.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
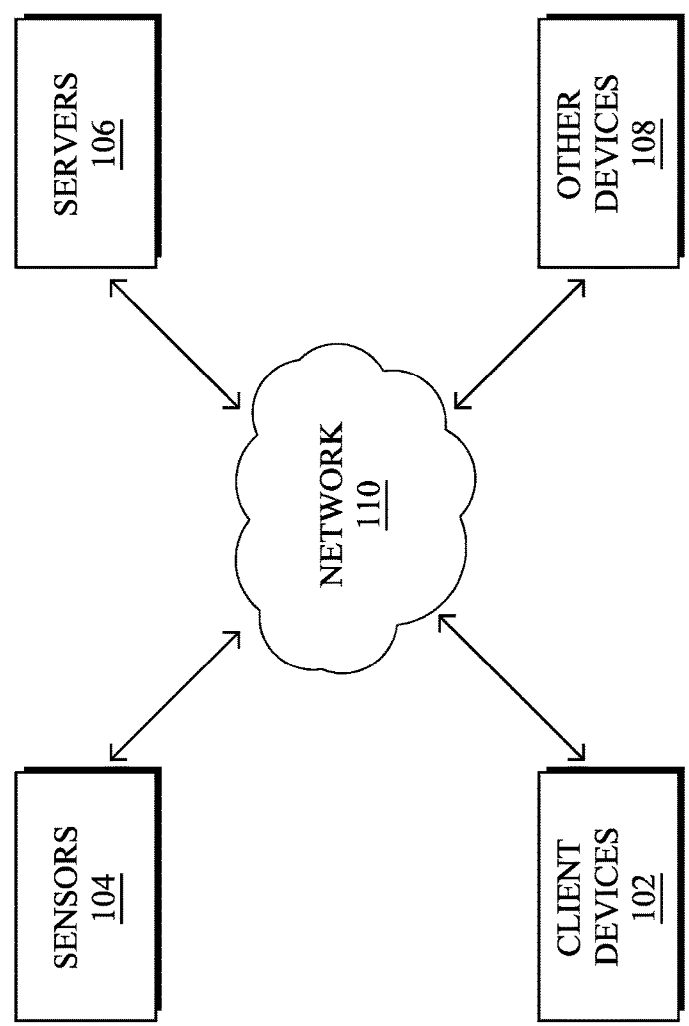
FIG. 1 illustrates an example computer system.

According to one or more embodiments of the disclosure, a device in a network monitors a plurality of traffic flows in the network. The device extracts a plurality of features from the monitored plurality of traffic flows. The device generates a context model by using deep learning and reinforcement learning on the plurality of features extracted from the monitored traffic flows. The device applies the context model to a particular traffic flow associated with a client, to determine a context for the particular traffic flow. The device personalizes data sent to the client from a remote source based on the determined context.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer system 100 illustratively comprising any number of devices in electronic communication with one another via a network 110. As shown, system 100 may include one or more client devices 102, one or more sensors 104, one or more servers 106, and/or one or more other devices 108. Those skilled in the art will understand that any number of nodes, devices, links, etc. may be used in computer system 100, and that the view shown herein is for simplicity. Also, those skilled in the art will further understand that while system 100 is shown in a certain orientation, system 100 is merely an example illustration that is not meant to limit the disclosure.

Network 110 may include any number of public networks, private networks, and/or direct connections between devices 102-108. For example, network 110 may include the Internet, one or more WANs, LANs, FANs, NANs, PANs, direct device communication links, combinations thereof, or other forms of data networks. Accordingly, network 110 may include any number of networking devices to facilitate data communications between devices 102-108 in system 100. For example, network 110 may include any number of wireless transceivers, routers, switches, servers, etc., to forward data packets between any of devices 102-108.

Network 110 may convey data communications over hardwired and/or wireless links. For example, a particular sensor 104 may communicate wirelessly with a cellular substation that is hardwired to a data center that houses a particular server 106. In some embodiments, any of devices 102-108 may be integrated together into a singular device, with data communications between the integrated devices being facilitated by a local bus or other communication mechanism. Example communication protocols that may be used in network 110 may include, but are not limited to, cellular protocols (e.g., GSM, CDMA, etc.), wireless protocols (e.g., WiFi, Bluetooth®, etc.), wired protocols (e.g., Ethernet, etc.), transport layer protocols (e.g., TCP, UDP, etc.), Internet layer protocols (e.g., IPv4, IPv6, etc.), or the like.

Generally, client devices 102 may include computing devices configured to convey information between a human user and one or more other remote devices 102-108 via network 110. Thus, client devices 102 may include any number of user interfaces that convey and/or receive sensory information. For example, a given client device 102 may include an electronic display, a speaker, a pointing device (e.g., a mouse, a touch screen, etc.), a microphone, or the like. For example, client devices 102 may include, but are not limited to, desktop computers, laptop computers, tablet devices, wearable devices (e.g., a smart watch, a head up display, etc.), smart televisions, set-top boxes, mobile phones, or any other form of consumer electronic device.

Sensors 104 may include any number of sensors associated with the environment(s) in which client devices 102 are located and/or any devices with which client devices 102 communicate. For example, in some cases, sensors 104 may include locational sensors (e.g., to determine the location of a given client device 102), building sensors (e.g., motion sensors, temperature sensors, humidity sensors, etc.), wearable sensors (e.g., heart rate monitors, etc.), or any other form of sensor capable of capturing information about the user of a client device 102 or the external environment of such a user. In further cases, sensors 104 may also include sensors associated with another device, such as a controlled industrial device with which a client device 102 communicates.

Servers 106 may include any number of computing devices that provide data and/or services to client devices 102. Example services may include, but are not limited to, search services, social networking services, project management services, enterprise resource planning (ERP) services, document management services, navigational services, video conferencing services, document management services, webpage services, or the like. Accordingly, servers 106 may also provide various data to client devices 102 either on a pull basis (e.g., in response to a request from a client device 102) or on a push basis (e.g., without first receiving a request for the data). In addition, servers 106 may exist on a stand-alone basis (e.g., a fixed server provides a fixed service) or may operate as part of a cloud or fog-based environment.

Other devices 108 may include any other form of devices that can communicate with devices 102-106. For example, other devices 108 may include, but are not limited to, networking devices (e.g., routers, switches, firewalls, intrusion detection and prevention devices, etc.), controlled equipment (e.g., actuators, etc.), or any other form of device in communication with network 110.

Figure 2:
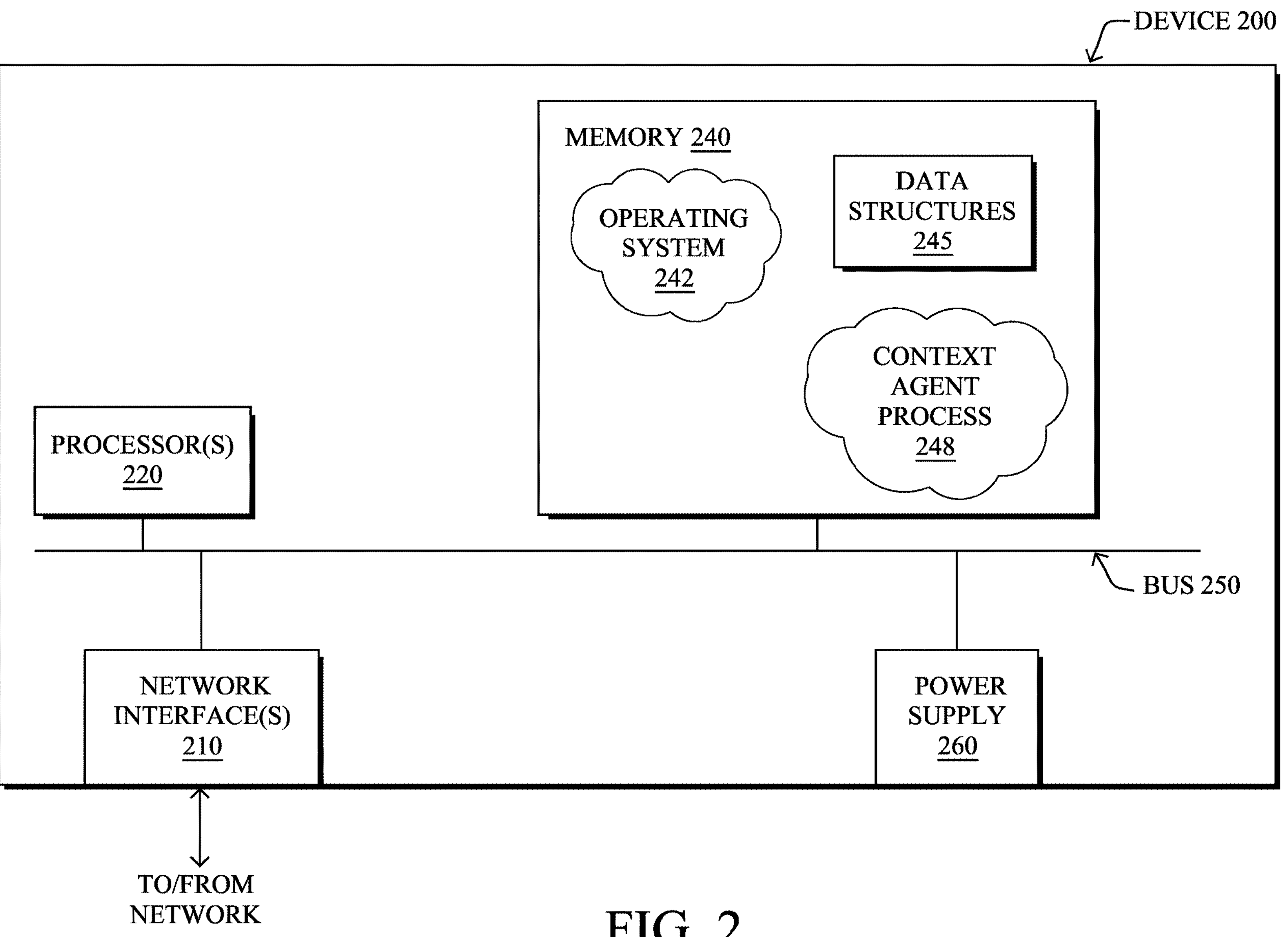
FIG. 2 illustrates an example network device/node.

FIG. 2 is a schematic block diagram of an example node/device 200 that may be used with one or more embodiments described herein, e.g., as any of the computing devices shown in FIG. 1 or any of the other devices referenced below. Device 200 comprises one or more network interfaces 210, one or more processors 220, and a memory 240 interconnected by a system bus 250.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a context agent process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, services are typically consumed on an individual basis. This limits the amount of context that any given service can garner regarding an interaction with a client device. For example, a retail webpage may obtain context regarding a user's viewing history, to suggest certain purchases to the user. However, informational cues and interaction histories for a given service tend to be transient. For example, if the user clears the cookies from his or her browser, the contextual information may be lost. In addition, since service interactions are performed on an individual basis, there is no sharing of context between services.

Contextual Services in a Network Using a Deep Learning Agent

The techniques herein introduce an intelligent agent that is trained to provide relevant and personalized data to a client device, based on contextual information received from a plurality of sources. In some aspects, these contextual sources may include traffic associated with any number of distributed devices and/or services. In further aspects, the agent may employ a deep learning pipeline, to select only those action sequences that maximize a predicted reward. Doing so allows the agent to become "smarter" over time based on the traffic flows and its access to the distributed services.

Specifically, according to one or more embodiments of the disclosure as described in detail below, a device in a network monitors a plurality of traffic flows in the network. The device extracts a plurality of features from the monitored plurality of traffic flows. The device generates a context model by using deep learning and reinforcement learning on the plurality of features extracted from the monitored traffic flows. The device applies the context model to a particular traffic flow associated with a client, to determine a context for the particular traffic flow. The device personalizes data sent to the client from a remote source based on the determined context.

Illustratively, the techniques described herein may be performed by hardware, software, and/or firmware, such as in accordance with the context agent process 248, which may include computer executable instructions executed by the processor 220 (or independent processor of interfaces 210) to perform functions relating to the techniques described herein.

Operationally, the techniques herein operate in a greedy manner to make optimal decisions in view of captured contextual data regarding a client device and/or user. FIGS. 3A-3D illustrate an example of an intermediate network device/node receiving contextual information.

Figure 3A:
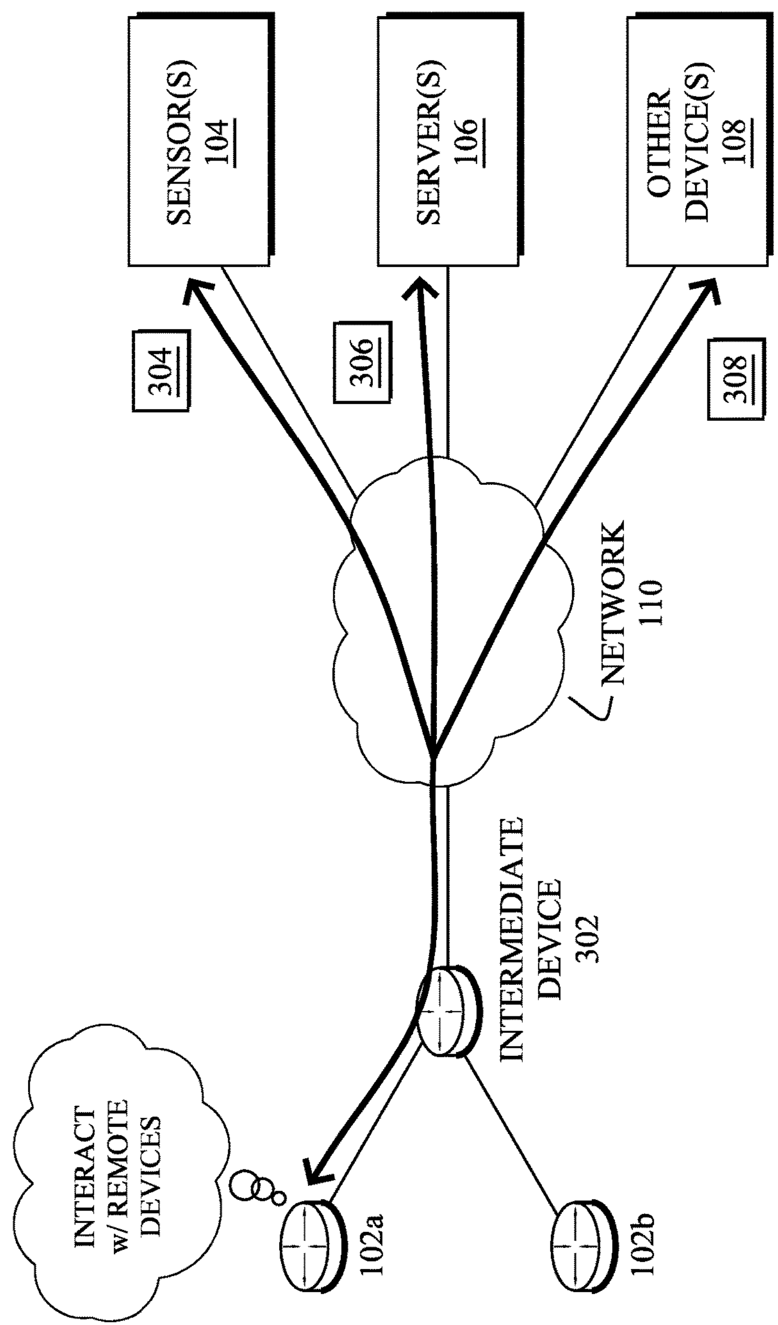
FIGS. 3A-3D illustrate an example of an intermediate network device/node receiving contextual information.

As shown in FIG. 3A, an intermediate device 302 may be in communication with network 110 and act as an intermediary with respect to traffic flows associated with client devices 102 (e.g., client device 102*a*, client device 102*b*, etc.). In various embodiments, intermediate device 302 may execute one or more intelligent, context agents (e.g., context agent process 248), to model contextual data associated with client devices 102*a*-102*b* and/or the specific users of client devices 102*a*-102*b*. In some embodiments, intermediate device 302 may execute such an agent in a lightweight container as a microservice. For example, intermediate device 302 may execute the context agent in a Linux Container (LXC), Docker container, or the like. Generally, containers operate in a manner similar to virtual machines, allowing a device to compartmentalize the execution of applications. In contrast to virtual machines, containers do not require the execution of a full operating system, allowing containers to be much more lightweight in comparison. Also, containers tend to be highly specific to the applications that they execute.

Figure 3B:
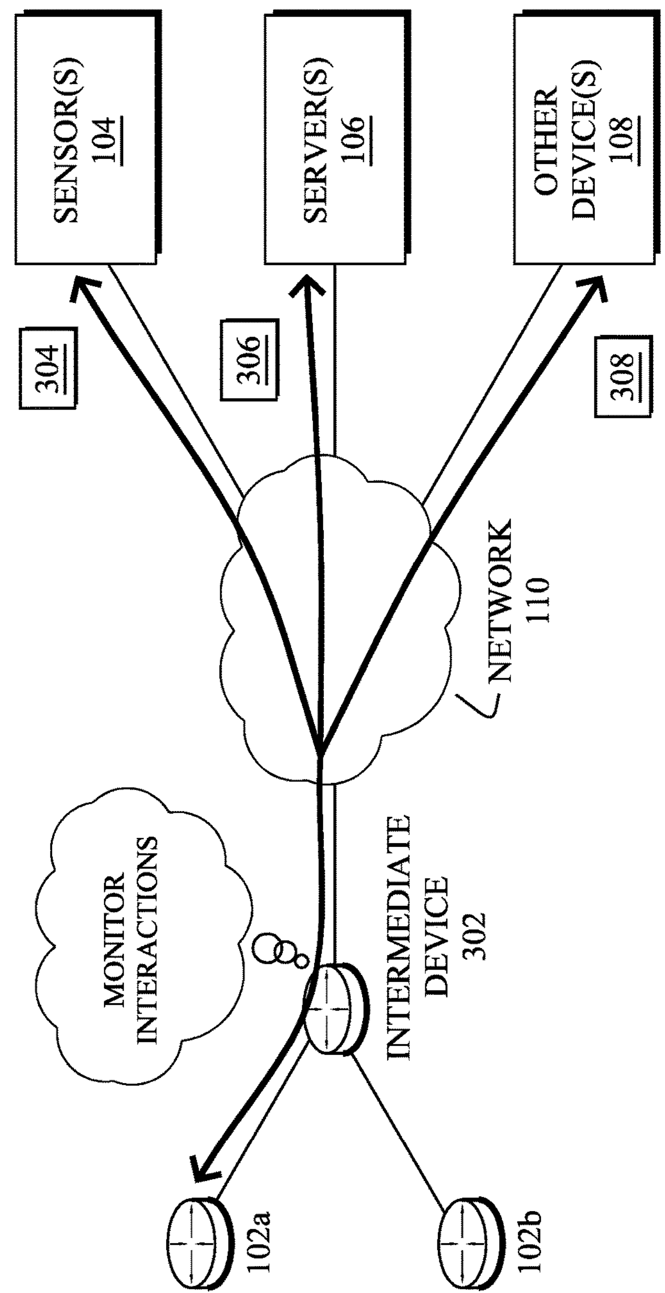

Client device 102*a* may interact with any number of remote devices 104-108 via intermediate device 302. For example, network 110 may convey traffic 304 between client device 102*a* and sensor(s) 104, traffic 306 between client device 102*a* and server(s) 106, and/or traffic 308 between client device 102*a* and other device(s) 108, via intermediate device 302. In various cases, intermediate device 302 may be a particular networking device along the paths of traffic 304-308, a cloud device that offers a cloud-based contextual service to traffic 304-308, etc. In such a case, as shown in FIG. 3B, intermediate device 302 may monitor the interactions with client device 102*a*, to capture contextual information regarding the interactions. Such contextual information may be associated with client device 102*a* itself and/or a user profile, if information is available regarding the user of client device 102*a* (e.g., based on logon information, etc.).

In some embodiments, the agent of intermediate device 302 may inspect the packets of traffic 304-308, to extract contextual features regarding these interactions. This enables the agent to learn user context from textual sources such as SMS, email, video conferencing transcriptions, as well as sensor data streams such as location analytics, wearable health sensors, and other sensor data streams. For example, intermediate device 302 may perform deep packet inspection (DPI), shallow packet inspection, and/or another form of packet inspection on packets of traffic 304-308, to identify search terms used in an online query and the response data returned from such a query.

Figure 3C:
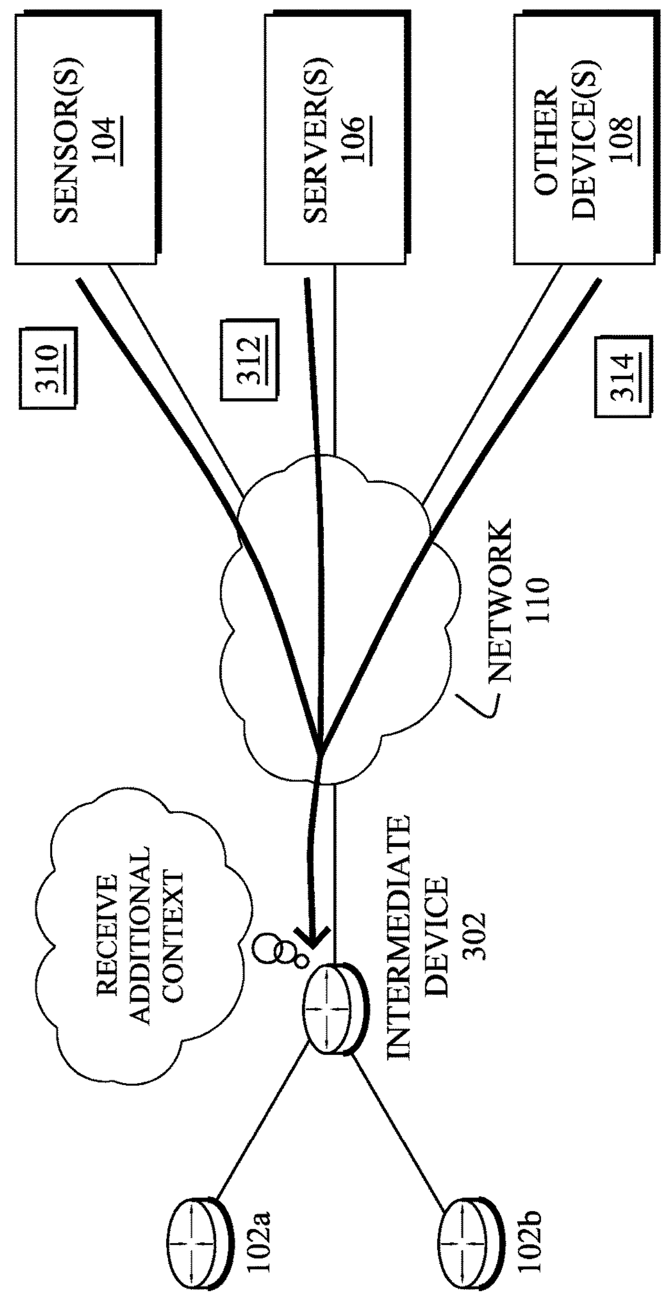

As shown in FIG. 3C, intermediate device 302 may also receive additional context information regarding client device 102*a* and/or the user of client device 102*a* directly from any of devices 104-108. In particular, intermediate device 302 may receive context information 310 from sensor(s) 104, context information 312 from server(s) 106, and/or context information 312 from other device(s) 108, on either a pull or push basis. For example, assume that client device 102*a* communicates with a wireless access point (WAP) in other devices 108 that is configured to determine the geolocation of its connected clients. In such a case, the WAP may provide the location of client device 102*a* and/or of any other devices near client device 102*a* to intermediate device 302 as part of context information 314. In this way, intermediate device 302 may receive additional context regarding what the user may be trying to achieve when interacting with remote devices 104-108.

Figure 3D:
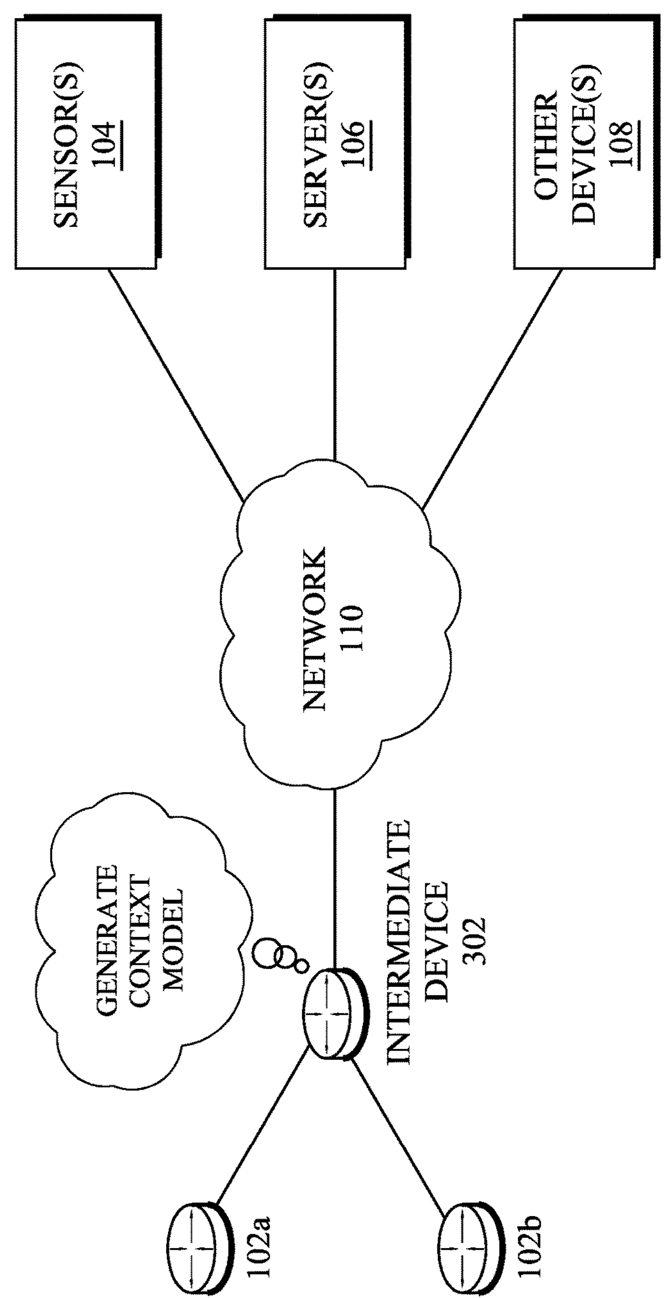

As shown in FIG. 3D, intermediate device 302 may generate a context model using the context information associated with client device 102*a* and/or the particular user of client device 102*a*. In some embodiments, the context agent microservice of intermediate device 302 may store the user or client context information in a persistent memory as a human-readable and editable semantic network or ontology and/or as a multi-data source deep hierarchical data fusion model. Generally, such a model may include a plurality of different statistical models that model different input features. Depending on regional standards, this system can be implemented as a secure enclave ensuring desired levels of employer/employee privacy and data protection.

In a simple example of a hierarchical model, consider a model that evaluates whether an animal is a mouse. One model in the hierarchy may model what a mouse sounds like, while another model may model what a mouse looks like. Such a technique can be applied, for example, to merge the various forms of collected context information into a unified context model for client device 102*a* and/or the particular user of client device 102*a*. By using deep learning pattern matching techniques and collaborative filtering, the context agent of intermediate device 302 is able to infer, from the captured context information, potential matches through continuous monitoring of the various traffic flows in network 110 (e.g., news group traffic, web page traffic, mail traffic, documentation storage traffic, etc.).

In a more specific example implementation, intermediate device 302 may implement its context agent using an intra-container hardware abstraction layer. Such a layer may interface specialized processing hardware (e.g., GPUs, FPGAs, ASICs, etc.) that are optimized for tensor computations at the core of the deep learning strategy. For example, such an intra-container abstraction layer may expose both OpenCL and CUDA compatible virtual devices. Intermediate device 302 may also execute a container host acceleration device manager that exposes the APIs of the processing hardware via the intra-container abstraction layer. Intermediate device 302 may also employ a declarative application topology language that identifies the computation nodes of the hierarchy as container image names and the data flows. Further, intermediate device 302 may employ a distributed, deep learning pipeline application (DLP) manager that instantiates, monitors, and scales the DLP application. The DLP manager may attempt to co-locate critical data flows onto a single compute node and provide shared memory I/O for data flows, where possible, falling back to network based data transfers in an optimal manner. Finally, intermediate device 302 may execute a meta-DLP manager configured to use deep learning architectures to dynamically optimize DLP applications combining deep learning based predictive models, control theory, reinforcement learning for solving the problem of optimal behavior of a deep learning agent.

As noted, the context agent of intermediate device 302 may use reinforcement learning techniques, to better refine its context model. Generally, such an approach leverages a custom objective function that quantifies one or more goals of the model. For example, intermediate device 302 may continually update its context model assigning priors to hypothesis, updating to promote hypothesis consistent with observations and associated rewards, providing the actions with the highest expected reward under its new probability distribution in an attempt to maximize the corresponding objective function, thereby also optimizing the model. Sequential decisions are based on posterior probabilities using a Markov Decision Process for learning agents in unknown or paryially known environments that find out proper corrective actions and achieve improved global context awareness.

FIGS. 4A-4D illustrate an example of an intermediate network device/node using a contextual model to personalize data, according to various embodiments. As noted above, intermediate device 302 may execute a deep learning-based agent that models the context information associated with a given client device or user. Such an agent may, for example, act as a proxy agent via which the client device connects to the various online services available to the client. In turn, the agent may use its constructed context model to personalize information sent back to the client device. In other words, the agent can use the context model to personalize results and provide relevant data to a user, while acting as a proxy, to gather more private and protected contextualization.

Figure 4A:
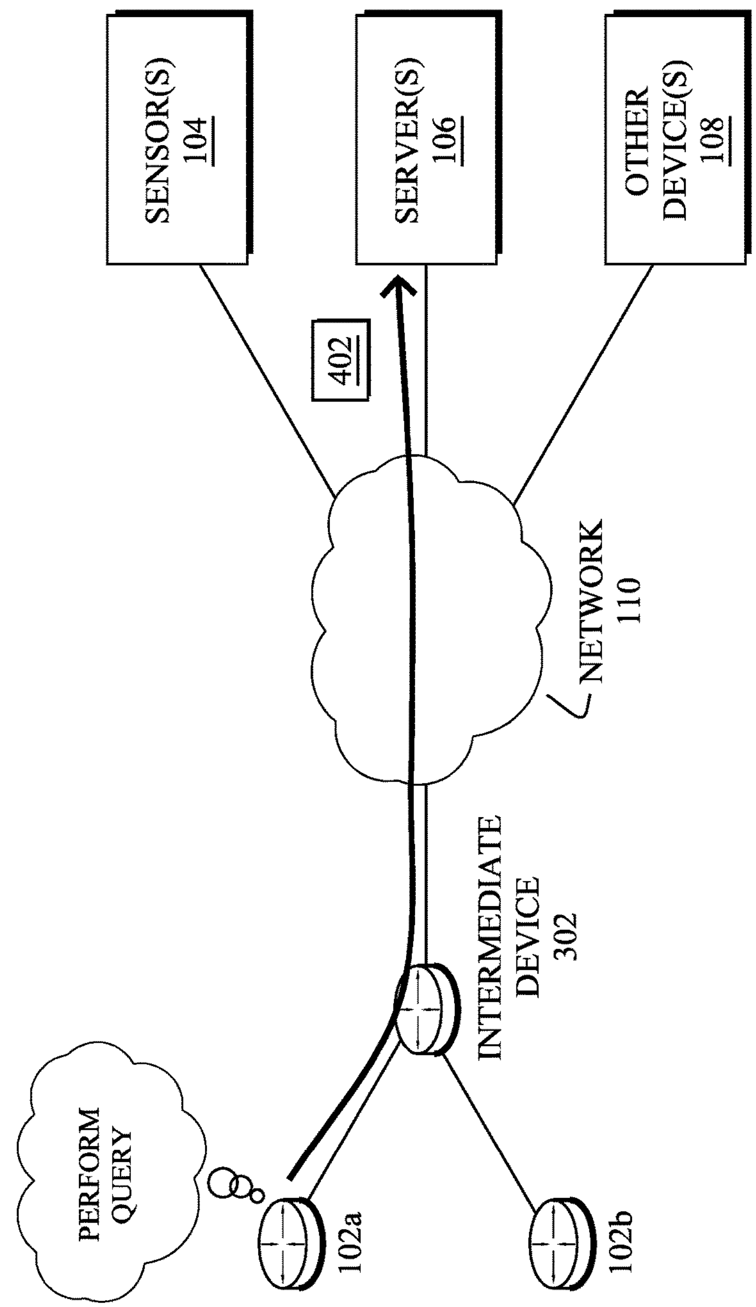
FIGS. 4A-4D illustrate an example of an intermediate network device/node using a contextual model to personalize data.

As shown in FIG. 4A, consider the example of client **102*a* sending a search query via traffic 402 to a particular server 106. For purposes of illustration only, assume that the search query in traffic 402 includes the search term, "computer monitor for sale," indicating that the user of client device 102*a* wishes to purchase a new computer monitor. In such a case, intermediate device 302 may intercept traffic 402 and analyze the search query, to identify the current context. In some cases, as would be appreciated, intermediate device 302** may employ any number of encryption interception mechanisms to analyze encrypted traffic.

Figure 4B:
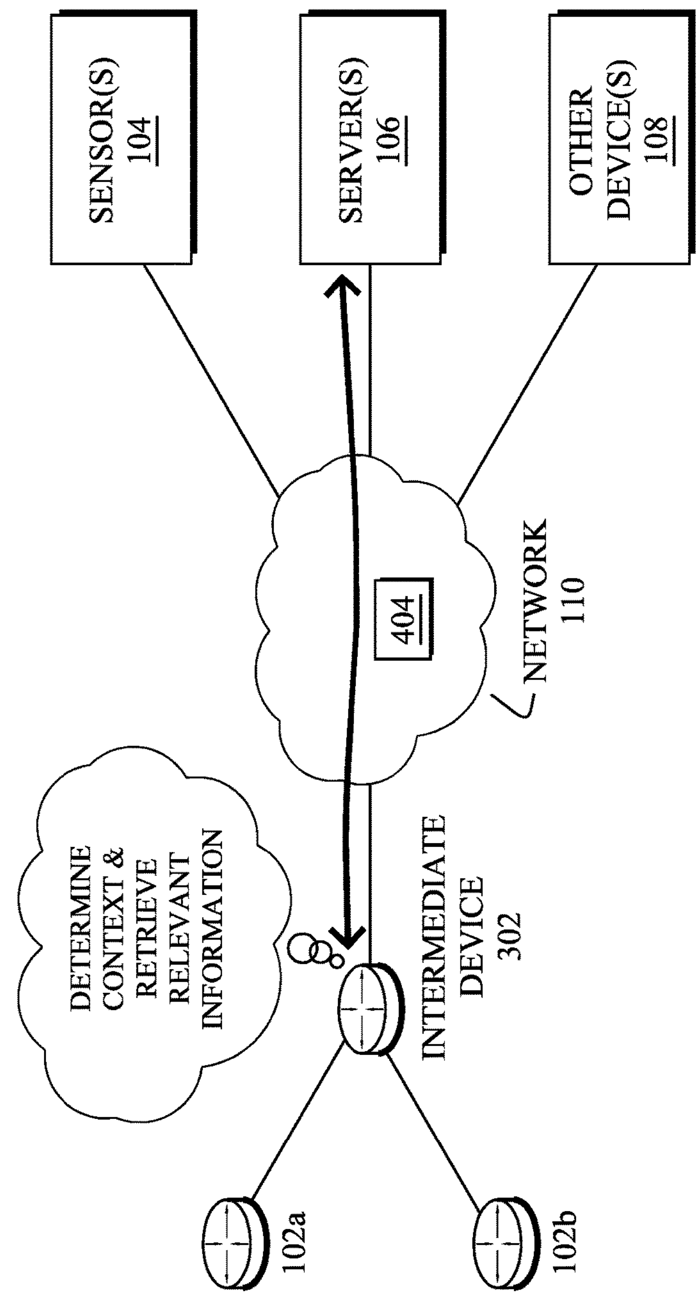

In FIG. 4B, the agent of intermediate device 402 may determine the context of traffic 402 using its deep learning-based context model. For example, based on the search query "computer monitor for sale," the current location of client device **102*a*, and other context information, the agent may determine that the user is looking for a new monitor for computer lab A (e.g., the current location of client device 102*a*). In response, intermediate device 302 may initiate its own interactions 404 with any number of devices 102-108, to retrieve relevant information for the identified context. For example, assume that one of servers 106 is a message board server, an email server, a messaging application server, etc. In such a case, intermediate device 302 may perform its own set of queries for messages that relate to monitors. For example, assume that a colleague of the user of client device 102*a* posted a message indicating that there is an unused monitor in computer lab B. In such a case, intermediate device 302 may retrieve this message, since it relates to the query initiated by client device 102*a***.

Figure 4C:
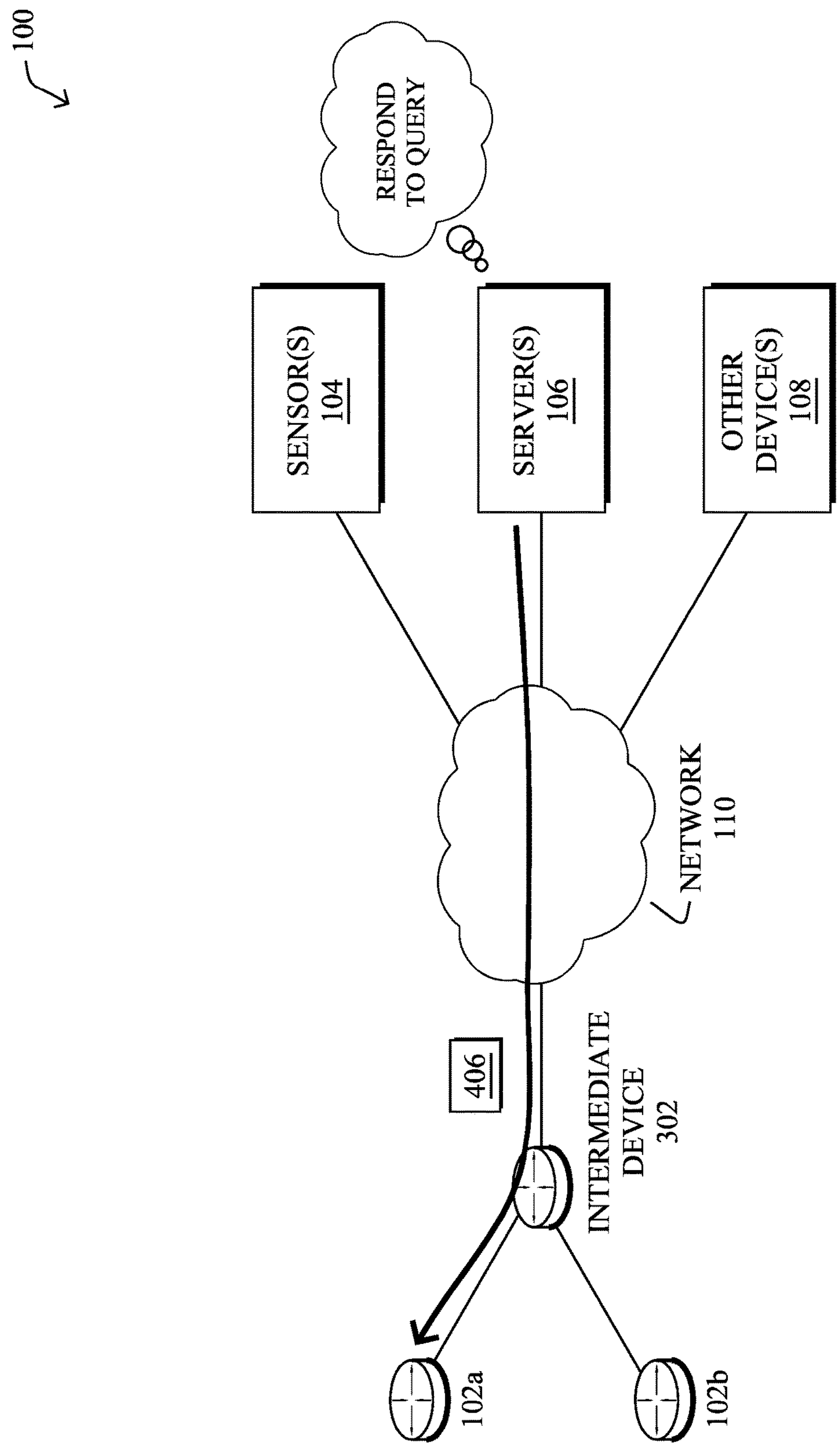

In FIG. 4C, the server 106 queried by client device **102*a* may return a query response via traffic 406 to client device 102*a*, in response to the search query sent by client device 102*a***. For example, if the initial query was sent to a search engine, the search engine may return a webpage listing retail websites that are selling computer monitors.

Figure 4D:
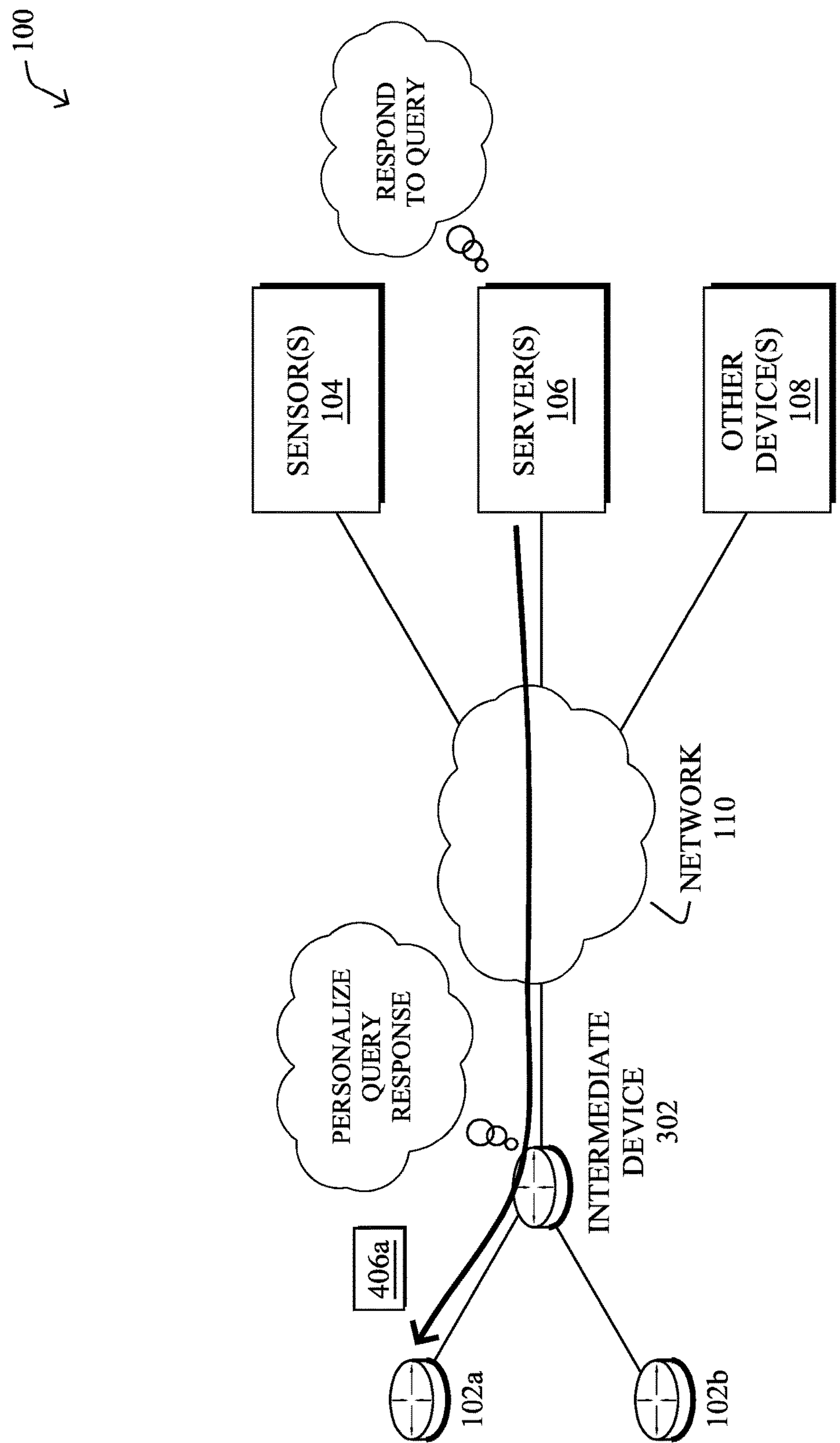

In FIG. 4D, according to various embodiments, intermediate device 302 may personalize response traffic 406 from the search engine using the information that intermediate device 302 retrieved based on the context. In one embodiment, intermediate device 302 may insert its own retrieved information into traffic 402 and send the modified traffic **402*a* on to client device 102*a*. In various embodiments, intermediate device 302 may insert its own retrieved information into the document object model (DOM) of the results webpage in traffic 402, to present the contextual-based results as a webpage overlay or as a specialized contextual user interface (UI) function. For example, assume that the results webpage in traffic 402 includes various links to retailers selling monitors. In such a case, the webpage included in personalized traffic 402*a* may include a contextual banner, area, etc., that also presents the user of client device 102*a*** with his or her coworker's message regarding the unused monitor in computer lab B. Thus, the user may decide to claim the unused monitor instead of purchasing a new one online.

In further embodiments, intermediate device 302 may push personalized data to client device **102*a* based on the current context of client device 102*a* or the user of client device 102*a*. For example, assume that client device 102*a* or another device associated with the user (e.g., a wearable device) detects and sends voice data to intermediate device 302 as context information. In such a case, intermediate device 302 may process the voice data (e.g., using voice recognition), to select personalized data that may be of relevance to the user and push the personalized data to client device 102*a***.

In yet another example, consider the case of a worker that is tasked with inspecting industrial equipment located throughout a plant or other area. At each piece of industrial equipment, the worker may operate a client device (e.g., client device **102*b*), to indicate whether the equipment passes the inspection. Using the system disclosed herein, intermediate device 302 may receive geolocation information regarding client device 102*b* (e.g., from a wireless access point, etc.), user information regarding the worker (e.g., the list of devices for which the worker is responsible, an inspection route followed by the worker based on prior inspections, etc.), equipment information regarding the industrial equipment along the inspection route, and the like. If the worker then operates client device 102*b* to indicate that a particular piece of equipment has not passed inspection, intermediate device 302 may send personalized data to client device 102***b* regarding the piece of equipment (e.g., a service manual, repair steps, etc.). If enough context information is available to intermediate device 302, intermediate device 302 may even push information regarding the device to client device 102*b* proactively. For example, based on the current context of the worker approaching a given piece of equipment, intermediate device 302 may send personalized data to client device 102*b* regarding the equipment (e.g., a history of prior readings from the equipment, things to note during the inspection, maintenance records for the equipment, etc.).

Figure 5:
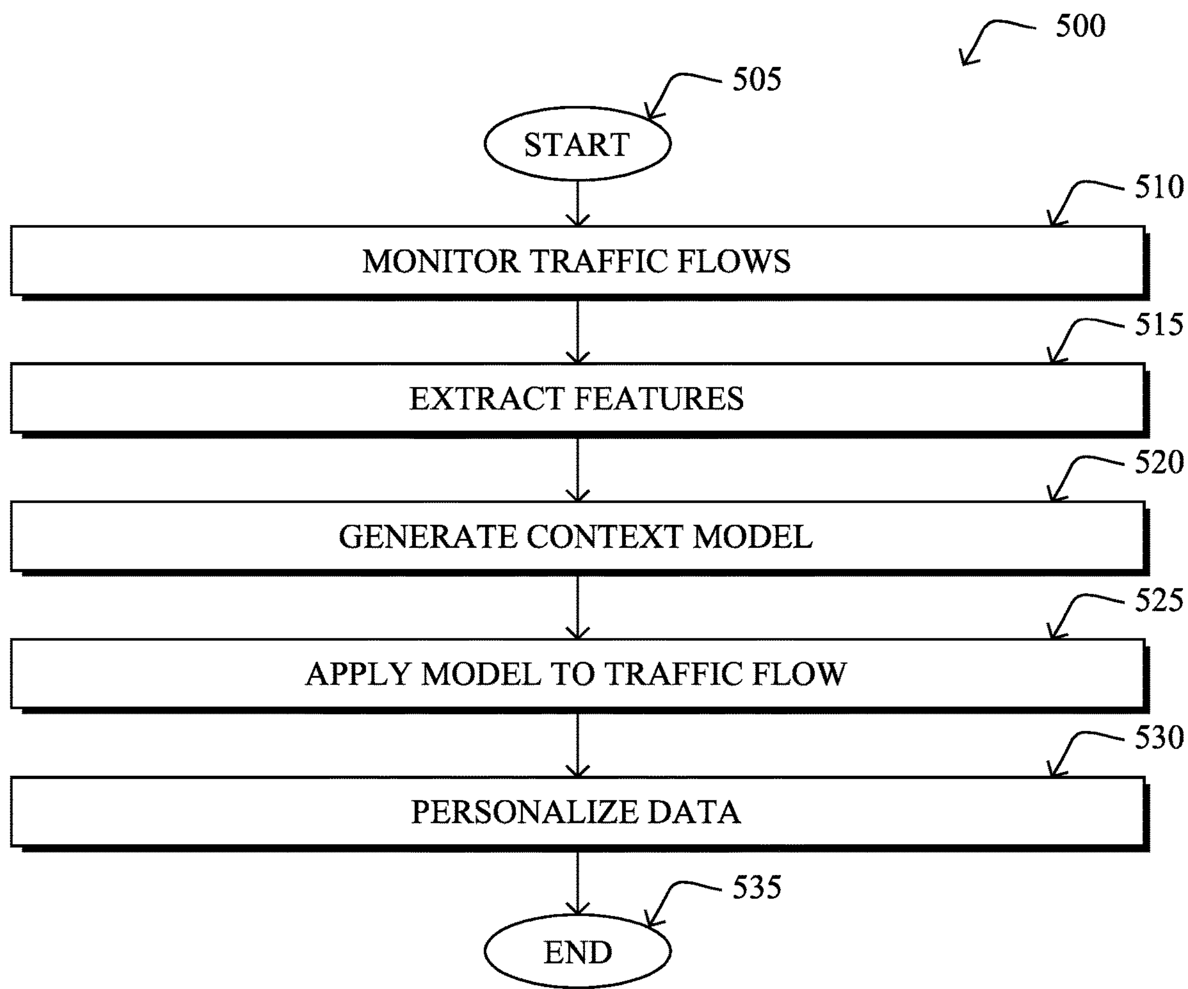
FIG. 5 illustrates an example simplified procedure for providing contextual services.

FIG. 5 illustrates an example simplified procedure for providing contextual services in a network, in accordance with one or more embodiments described herein. For example, a non-generic, specifically configured device (e.g., device 200) may perform procedure 500 by executing stored instructions (e.g., context agent process 248). The procedure 500 may start at step 505, and continues to step 510, where, as described in greater detail above, the device may monitor a plurality of traffic flows in the network. For example, the device may itself be a networking device located along the paths of the traffic flows or a proxy service through which the traffic flows traverse.

At step 515, as detailed above, the device may extract context features from the monitored traffic flows. For example, the device may inspect the headers of the packets in the traffic flows, to determine which users, client devices, applications, remote services, etc. are associated with the flows. The device may also inspect the payloads of the packets, to derive additional context features. For example, if a particular traffic flow is sent to a search engine, the payload of the flow may include a set of search terms. If the traffic itself is encrypted, the device may also employ any of the various encryption interception mechanisms (e.g., decryption proxy that acts as a man-in-the-middle, etc.), to access the payloads of the traffic or resolve to shallow packet inspection to retrieve behavioral network characteristics such as packet size, packets inter-arrival time, packet ordering, etc. to rely exclusively on the statistical poperties of the flows and generate a protocol fingerprint that characterizes network traffic properties in compact and efficient way.

At step 520, the device may generate a context model using the extracted context features, as described in greater detail above. In various embodiments, the device may generate the model using deep learning pattern matching techniques on the extracted features. For example, the context model may be a hierarchical model that includes any number of statistical models regarding different subsets of feature data. The model may also take into account any number of additional features outside of the monitored traffic flows. For example, the device may also receive additional context information such as user information (e.g., from a user profile service), geolocation information, security information, etc., regarding the client devices and/or particular users associated with the monitored traffic flows. In some embodiments, the device may also use a reinforcement mechanism, to improve the results of the model over time. For example, the device may adjust the model over time, in an attempt to optimize an objective function associated with the model.

At step 525, as detailed above, the device may apply the context model to a particular traffic flow associated with a client, to determine the context for the particular traffic flow. For example, assume that a given client device sends a search query to an online search engine. In such a case, the device may use the context model to determine the context for the current query. In other words, the context model may seek to determine what the user actually wants, based on the entire set of gathered context regarding the user and/or client device. For example, if the user had previously mentioned in conversation that he or she needs a replacement part for a particular piece of equipment, the device received the audio of this conversation as context information, and the user later runs a search query for the part, the device may identify that the query is for the particular piece of equipment mentioned previously by the user.

At step 530, the device may personalize data sent to the client from a remote source based on the determined context. In various embodiments, the device may personalize data by retrieving information from one or more remote sources, based on the context determined by the context model for the particular traffic flow. For example, if the traffic flow is a query/response exchange between the client and a search engine, the device may retrieve additional, more personalized data for the client, based on the context of the query determined by the context model. In turn, the device may include the personalized data in the response sent back to the client. For example, the device may insert the personalized data in the DOM of the search results, as a personalization overlay, or the like. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an intelligent agent (micro)service that leverages deep learning and a hybrid semantic network/ontology as part of a data fusion model, to model and identify context for client devices and/or individual users. In some aspects, the agent may act as a proxy service that analyzes network traffic from the various client devices, to capture features for the context model. Based on the current context of the client device and/or user, the agent is able to send personalized information that takes into account any or all of the context surrounding the current actions of the user or client device.

While there have been shown and described illustrative embodiments that provide for contextual services in a network using a deep learning agent, it is to be understood that various other adaptations and modifications may be made within the spirit and scope of the embodiments herein. For example, while certain embodiments are described herein with respect to using certain models for purposes of modeling context, the models are not limited as such and may be used for other functions, in other embodiments. In addition, while certain protocols are shown other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
monitoring, by a device in a network, a plurality of traffic flows in the network between a client and a first remote source;
extracting, by the device, a plurality of features from the monitored plurality of traffic flows;
generating, by a context agent in a software container on the device, a context model by using deep learning and reinforcement learning on the plurality of features extracted from the monitored traffic flows;
executing, by the device, the context agent in the software container;
applying, by the device, the context model to a particular traffic flow associated with the client, to determine a context for the particular traffic flow; and
personalizing, by the device, a web page to the client from the first remote source based on the determined context.

2. The method as in claim 1, wherein extracting the plurality of features from the monitored traffic flows comprises:
performing, by the device, deep packet inspection or shallow packet inspection on packets of the monitored traffic flows to derive the plurality of features.

3. The method as in claim 1, further comprising:
identifying, by the device, a user profile associated with the particular traffic flow; and
selecting, by the device, the context model to be applied to the particular traffic flow based on the identified user profile.

4. The method as in claim 3, wherein the plurality of features comprises at least one of:
a geolocation of the client, a topic of interest associated with the user profile, or a social connection of the user profile.

5. The method as in claim 1, further comprising:
intercepting, by the device, the particular traffic flow, wherein the device is an intermediate device along a network path between the client and the remote source.

6. The method of claim 1, wherein the context agent becomes more intelligent over time based the plurality of features extracted from the monitored traffic flows.

7. An apparatus, comprising:
one or more network interfaces to communicate with a network between a client and a first remote source;
a processor coupled to the network interfaces and configured to execute one or more processes; and
a memory configured to store a process executable by the processor, the process when executed operable to:
monitor a plurality of traffic flows in the network between a client and a first remote source;
extract a plurality of features from the monitored plurality of traffic flows;
generate, by a context agent in a software container, a context model by using deep learning and reinforcement learning on the plurality of features extracted from the monitored traffic flows;
execute the context agent in the software container;
apply the context model to a particular traffic flow associated with the client, to determine a context for the particular traffic flow; and
personalize a web page sent to the client from the first remote source based on the determined context.

8. The apparatus as in claim 7, wherein the apparatus extracts the plurality of features from the monitored traffic flows by:
performing deep packet inspection or shallow packet inspection on packets of the monitored traffic flows to derive the plurality of features.

9. The apparatus as in claim 7, wherein the process when executed is further configured to:
identify a user profile associated with the particular traffic flow; and
select the context model to be applied to the particular traffic flow based on the identified user profile.

10. The apparatus as in claim 9, wherein the plurality of features comprises at least one of: a geolocation of the client, a topic of interest associated with the user profile, or a social connection of the user profile.

11. The apparatus as in claim 7, wherein the process when executed is further configured to:
intercept the particular traffic flow, wherein the apparatus is an intermediate networking device along a network path between the client and the remote source.

12. The apparatus as in claim 7, wherein the process when executed is further operable to:
determine a second context for the client using the context model;
retrieve data from the remote source based on the second context; and
proactively push the retrieved data to the client.

13. The apparatus of claim 7, wherein the context agent becomes more intelligent over time based the plurality of features extracted from the monitored traffic flows.

14. A tangible, non-transitory, computer-readable medium storing program instructions that cause a device in a network to execute a process comprising:
monitoring a plurality of traffic flows in the network between a client and a first remote source;
extracting a plurality of features from the monitored plurality of traffic flows;
generating, by a context agent in a software container, a context model by using deep learning and reinforcement learning on the plurality of features extracted from the monitored traffic flows;
execute the context agent in the software container;
applying the context model to a particular traffic flow associated with the client, to determine a context for the particular traffic flow; and
personalizing a web page sent to the client from the first remote source based on the determined context.

15. The tangible, non-transitory, computer-readable medium as in claim 14, wherein the process further comprises:
identifying, by the device, a user profile associated with the particular traffic flow; and
selecting, by the device, the context model to be applied to the particular traffic flow based on the identified user profile.

16. The tangible, non-transitory, computer-readable medium as in claim 14, wherein the plurality of features comprises at least one of: a geolocation of the client, a topic of interest associated with the user profile, or a social connection of the user profile.

17. The tangible, non-transitory, computer-readable medium as in claim 14, further comprising:
intercepting, by the device, the particular traffic flow, wherein the device is an intermediate device along a network path between the client and the remote source.

18. The tangible, non-transitory, computer-readable medium of claim 14, wherein the context agent becomes more intelligent over time based the plurality of features extracted from the monitored traffic flows.

* * * * *